UNITED STATES PATENT OFFICE.

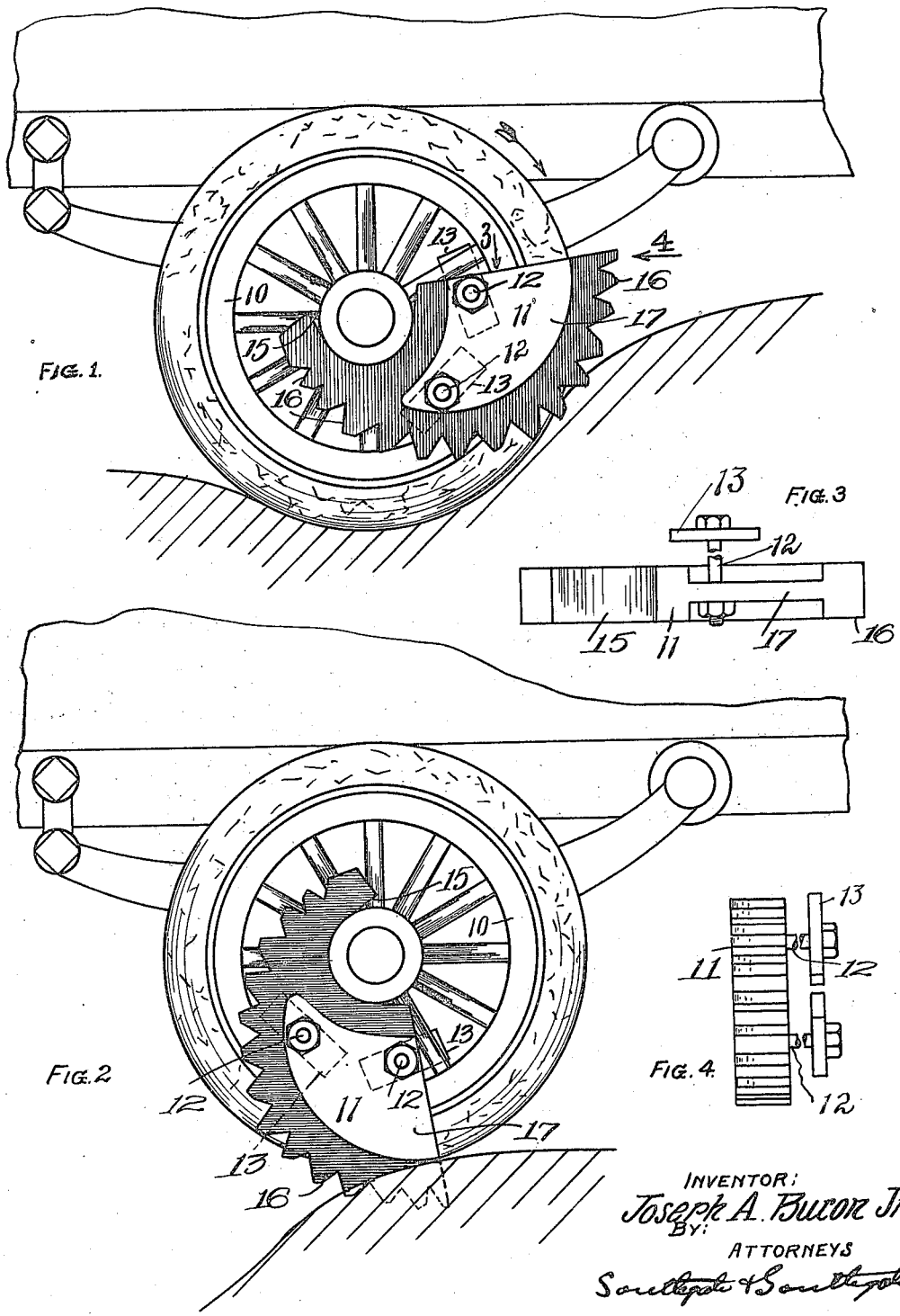
J. A. BURON, Jr.
AUTOMOBILE EXTRICATING DEVICE.
APPLICATION FILED JUNE 16, 1921.
1,424,616.
Patented Aug. 1, 1922.

JOSEPH A. BURON, JR., OF WORCESTER, MASSACHUSETTS.

AUTOMOBILE EXTRICATING DEVICE.

1,424,616.  Specification of Letters Patent.  Patented Aug. 1, 1922.

Application filed June 16, 1921. Serial No. 478,146.

*To all whom it may concern:*

Be it known that I, JOSEPH A. BURON, Jr., a citizen of the United States, residing at Worcester, in the county of Worcester and State of Massachusetts, have invented a new and useful Automobile Extricating Device, of which the following is a specification.

This invention relates to a device for attachment to the wheels of an automobile or truck for the purpose of lifting it up out of a rut or the like in which it may have settled. The principal object of the invention is to provide a device of this character which will be very simple on account of consisting of no relatively moving parts and which can be applied to the wheels easily by an unskilled operator, and especially to provide such a device in a form which will enable it to grip the slanting surface of the rut in the road and, merely by rotating the wheel, lift it substantially up to the level of the road surface.

Reference is to be had to the accompanying drawings, in which

Fig. 1 is a side elevation of a truck wheel down in a rut with a preferred form of this invention applied thereto;

Fig. 2 is a similar view showing the position of the parts when the wheel is extricated from the rut;

Fig. 3 is a plan of the attachment in the position shown in Fig. 1, and

Fig. 4 is an end view.

I have shown the invention as applied to the rear or driving wheel 10, and it will be understood that one of the attachments is applied to each of the rear wheels in ordinary cases, in which they are both sunk into the road. The attachment is very simple in character, consisting of a single piece 11 of cast iron or the like in the form of a segmental rack. This casting is provided with openings through which bolts 12 can be passed for the purpose of securing it to the wheel. In the form shown, each of these bolts passes between two of the spokes of the wheel and is provided on the back with a plate 13 adapted to bridge two spokes. Any desired number of such fastening devices can be used, and it will be understood that when applied to the disc or other type of wheel the fastening arrangements can be modified accordingly.

The extricator 11 itself consists of a casting, preferably having a centering portion consisting of a curved depression 15 on one edge for receiving the hub of the wheel. This constitutes a portion of the means for fixing the device in position. The extricator itself is of eccentric form with respect to the wheel and is provided with external teeth or projections 16 extending substantially all the way from the hub to the outer edge of the device. These teeth preferably extend clear across the edge, and it will be observed that the distance from the center of the wheel or the surface 15 gradually increases from one end to the other. The portion on which these teeth are located, constituting the rim of the device and the part surrounding the hub of the wheel, preferably, are formed of considerable thickness. The part 17 coming between these thick portions can be made comparatively thin in the form of a web. It is in this part preferably that the fastening bolts 12 are located.

In the use of the device, with one or both wheels down in the rut as shown in Fig. 1, the extricators are put on the wheels in substantially the position shown in that figure. In other words, the device is placed at the side of the wheel with the depression 15 engaging the hub and the teeth out toward the front resting on the ground, and usually on the sloping side of the rut. Having placed the device in that position the bolts 12 are inserted and their nuts tightened up. It will be seen that the device is attached to the wheel in the simplest possible manner. Now the engine is started and the wheel rotates and, instead of spinning around in the road, the rotation of the shaft causes the two extricators to dig into the sides of the road, and the wheel is turned by the respective teeth of the extricator in a forward and upward direction. The result is indicated in Fig. 2. Very often it will be found desirable to put a board or plank along the side of the wheel for the device to bear on. This stops it from sinking in.

It will be seen that this constitutes an extremely simple device for the purpose above described and that on account of the location of the teeth all the way from one end to the other, it can be applied in all kinds of roads in all kinds of positions. In some cases it would have to be applied in such a way as to point upwardly from the hub, in which case the teeth near the hub would rest on the ground above the road.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. As an article of manufacture, a device for use in extricating automobiles from ruts or the like comprising a casting of segmental shape having substantially a circular depression in the edge near one end adapted to receive the hub of the wheel, and provided with means for firmly fixing it to the wheel, and having a curved bottom surface gradually increasing in distance from the depression to the other end for the purpose described.

2. As an article of manufacture, an extricator for the purpose described, comprising a plate of a general segmental form, having a circular depression in its upper edge near one end for centering it on the hub of the wheel, and provided with means at a distance from said depression for fixing it positively to the wheel and provided with a row of transverse teeth across its bottom surface arranged in the form of a curve gradually increasing in distance from the center of said depression and extending all the way to the depression.

3. As an article of manufacture, an extricator for the purpose described, comprising a plate adapted to be firmly fixed to a wheel parallel with its plane, having on its bottom surface a row of transverse teeth extending substantially all the way from the hub of the wheel to a position immediately beyond the edge of the tire, and gradually increasing in distance from the hub to the other end.

In testimony whereof I have hereunto affixed my signature.

JOSEPH A. BURON, Jr.